Figure 1:
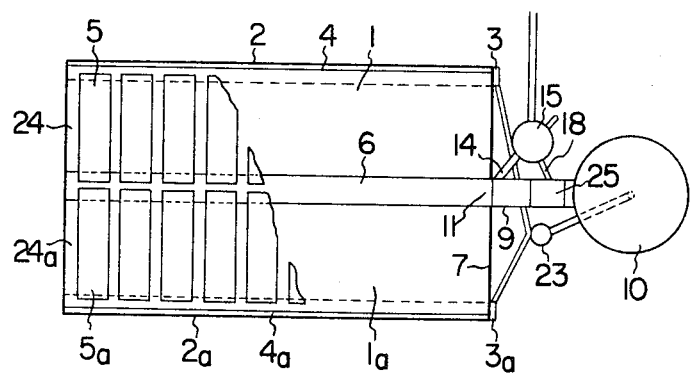

Aug. 20, 1968     HIROSHI SHIBATA     3,398,070

MERCURY-CATHODE CHLORINE CELLS

Filed March 17, 1966

Hiroshi Shibata,
INVENTOR

BY Wenderoth,
Lind and Ponack,
Attorneys

3,398,070
MERCURY-CATHODE CHLORINE CELLS
Hiroshi Shibata, Nakoso-shi, Japan, assignor to Kureha Kagaku Kogyo Kabushiki Kaisha, Tokyo-to, Japan
Filed Mar. 17, 1966, Ser. No. 535,101
Claims priority, application Japan, Mar. 29, 1965, 40/18,180
2 Claims. (Cl. 204—99)

This invention relates to mercury-cathode chlorine cells and more particularly to improvements therein or relating thereto.

More specifically, the present invention relates to improvements in or relating to mercury-cathode chlorine cells of the type I have previously proposed wherein primary electrolysis is carried out by causing mercury to flow on and along the bottom plate of an oblong electrolytic chamber in the transverse direction thereof, and then, as this mercury is caused to flow into a mercury flow-out trough provided perpendicularly to the mercury flow direction in the primary electrolytic chamber over a side wall part of the outflow trough to carry out a further, secondary electrolysis within the outflow trough, the mercury is caused to flow out through a transverse side of the electrolytic cell.

In an electrolytic cell of this character, the flow path of the primary electrolytic chamber can be made extremely short. Accordingly, the mercury retention time (or pass-through time) within the cell is reduced to a very short time, and the amalgam concentration is also reduced. As a result, the quantities of undesirable substances such as mercury butter and hydrogen formed per unit current can be held at low values, and the current efficiency can be remarkably raised. Moreover, high current density operation is made possible.

However, even in this electrolytic cell, when foreign substances such as mercury butter and graphite particles produced by the disintegration of the graphite electrode accumulate within the electrolytic cell, these foreign substances cause a lowering of the overvoltage of the mercury, denude the amalgam to generate hydrogen, and cause a lowering of the current efficiency. In addition, there is the risk of these foreign substance which are floating on the surface of the mercury cathode contacting the anode plate to cause a short circuit.

In order to remove these foreign substance, the method resorted to heretofore has comprised providing a return brine box partitioned from the electrolytic chamber by a brine damper outside of the electrolytic chamber, causing the return brine and mercury to flow into this return brine box, causing the brine to flow out through a return brine pipe within the brine box and the mercury to flow out by passing under a mercury damper provided at the outlet of the brine box thereby to cause the foreign substances to collect on the mercury surface upstream from the mercury damper, and opening a clean-out opening at the upper part of the brine box and ladling out the foreign substances thus collected.

Even in this case, however, since the mercury surface within the return brine box is at the same level as the mercury surface within the aforementioned flow-out trough, not only does the risk of short circuiting within the electrolytic cell due to accumulation of foreign substances remain unremoved, but the frequent cleaning by hand of a large number of electrolytic cells requires much labour. Moreover, frequent opening of the cover of the return brine box of high chlorine concentration and mercury vapour concentration is detrimental to the work environment and, therefore, is not desirable.

It is an object of the present invention to overcome the above mentioned difficulties. More specifically, it is an object of the invention to provide a relatively simple method and effective device for disposal of the flow-out mercury, brine, and foreign substances discharged from an electrolytic cell of the type referred to above whereby these discharged substances can be continuously and effectively separated from each other in a simple and safe manner.

According to the present invention, briefly stated, there is provided a method for disposal of flow-out mercury, brine, and foreign substances discharged from a mercury-cathode chlorine cell of the above referred to type, said method being characterised by the operations of discharging a greater part of the flow-out mercury through a mercury main discharge outlet provided at the lower part of the outlet end of said trough to an amalgam decomposer, discharging return brine and foreign substances suspended above the mercury together with a portion of the mercury through a return brine pipe having an inlet in the vicinity of said outlet end of said flow-out trough, said inlet having a lower rim positioned at the same level as or a slightly higher level than the surface of the mercury in said trough at said outlet end, continuously separating from each other said return brine, mercury, and foreign substances thus discharged by means of a separator tank, and continuously conveying the mercury thus separated to a point of confluence with the mercury discharged by said mercury main discharge outlet toward said amalgam decomposer.

According to the present invention there is further provided means for accomplishing the above set forth method, as described in detail hereinafter.

By the practice of the present invention, since the foreign substances such as mercury butter and graphite particles are collected in a separator tank which is completely isolated from the mercury within the electrolytic cell, they have no detrimental effect on the electrolytic cell even when they accumulate, and it is possible, moreover, to reduce the frequency of cleaning operation. Furthermore, the mercury butter, graphite particles, and other foreign substances which accumulate above the surface of the mercury in the separator tank can be readily revolved by leading, and, moreover, leakage of harmful gases such as chlorine gas can be eliminated.

In addition, by providing a discharge pipe for draining off foreign substances having an inlet at a level slightly higher than that of the mercury surface in the separator tank, the foreign substances collected above said mercury surface can be readily removed.

Furthermore, since the quantity of mercury discharged together with brine into the separator tank is very small, it is possible to maintain the quantity of mercury retained within the separator tank also at a small value. As a result, the rate of denuding of amalgam within the separator tank, in which electrolysis is not carried out, also is extremely low, and the current efficiency can be improved.

The nature, principle, and details of the invention will be more clearly apparent from the following detailed description with respect to a preferred embodiment of the invention as illustrated in the accompanying drawing, in which like parts are designated by like reference numerals.

Figure 2:
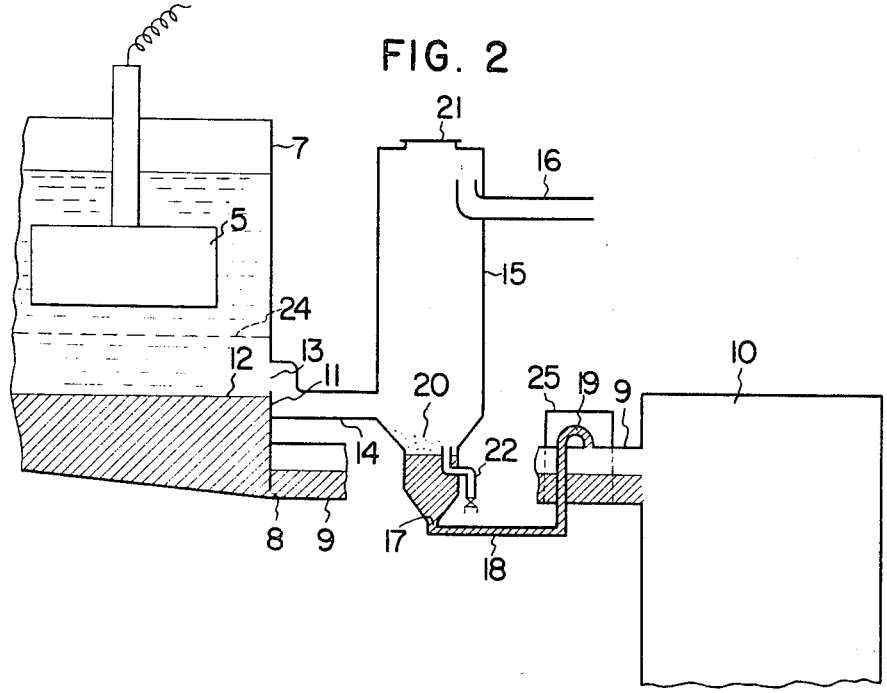

In the drawing:

FIGURE 1 is a simplified plan view, with parts cut away, showing the example of the mercury-cathode chlorine cell embodying the invention; and FIGURE 2 is a schematic elevational view, in vertical section with parts cut off, showing the details of the separation device according to the invention for the electrolytic cell shown in FIGURE 1.

Referring to FIGURE 1, the principal operational part of the mercury-cathode chlorine cell shown therein consists of primary electrolytic chambers 1 and 1a. Mercury delivered by a mercury pump 23 enters side channels 3 and 3a provided below the side walls 2 and 2a in the longitudinal direction of respective chambers 1 and 1a and then pass through slits 4 and 4a to flow into respective primary electrolytic chambers 1 and 1a.

Within the primary electrolytic chambers 1 and 1a, the mercury flows in the transverse direction over the surface of electrolytic chamber cathodes 24 and 24a, respectively, and accomplishes electrolysis of brine between electrodes 5 and 5a. The mercury then flows down as unitary films into a mercury flow-out trough 6 over the side walls thereof and, as it further accomplishes a secondary electrolysis, flows along the flow-out trough 6 in a direction perpendicular to that of the mercury flow in the primary electrolytic chambers, being discharged out of the cell through a mercury discharge outlet 8 provided at the lower part of a transverse side wall 7 of the electrolytic cell. Most of the mercury thus discharged passes through a mercury main discharge pipe 9 and enters an amalgam decomposer (or denuding tower) 10.

The mercury flow-out trough 6 terminates at an extreme end wall 11 at the lower part of which the mercury discharge outlet 8 is formed. At the upper part of this end wall 11, there is provided an inlet 13 with a lower lip which is positioned at a level slightly higher than the mercury surface level 12 within the flow-out trough 6. The return brine returns through this inlet 13 and flows into a brine pipe 14.

By this arrangement, foreign substances such as mercury butter and graphite particles which have floated to the extreme end of the flow-out trough 6, together with a part of the mercury flowing in the flow-out trough, are drawn into the flow of brine and, rising to the surface, are discharged together with the brine through the brine pipe 14.

The return brine pipe 14 is connected to a separator tank 15, where the return brine is separated and recirculates through a pipe 16 to a salt dissolving tank (not shown). Depending on the necessity, it is also possible to recirculate a portion of the return brine to the electrolytic cell in accordance with Japanese Patent 311,699. The mercury which has collected at the bottom of the separator tank 15 passes out through an outlet 17 at the bottom of the separator tank, through a pipe 18 and an opening 19, into the aforementioned mercury main discharge pipe 9. In this arrangement, by setting the opening 19 at a position such as to maintain adequately the surface level of the mercury in the separator tank 15, it is possible to establish equilibrium between the hydrostatic head of the mercury in the pipe 18 and the hydrostatic head of the mercury and brine in the separator tank 15 whereby the mercury can be continuously separated.

Foreign substances 20 suspended at the interface between the mercury and brine can be removed through an opening at the top of the separator tank 15 after the cover 21 is opened. Alternatively, a discharge pipe 22 can be placed with its inlet at or slightly above the interface as shown. The output end 19 of the pipe 18 is enclosed within a cover 25 secured to and above the mercury main discharge pipe 9.

The principal feature of the present invention lies in the provision of a mercury separation means, one example of which has been described above. Without this separation means, it would be extremely difficult to discharge only foreign substances together with the return brine and to prevent foreign substances from being swept along with the mercury, and the quantity of mercury within the electrolytic cell would progressively decrease with long operation time until, finally, operation would become impossible.

While the invention has been described above with respect to an example of an electrolytic cell having primary electrolytic chambers on the two sides of a mercury flow-out trough, the invention can be effectively and similarly applied also to arrangements wherein a primary electrolytic chamber is provided on only one side of flow-out trough.

Accordingly, it should be understood that the foregoing disclosure relates to only one preferred embodiment of the invention and that it is intended to cover all changes and modifications of the example of the invention herein chosen for the purposes of the disclosure, which do not constitute departures from the spirit and scope of the invention as set forth in the appended claims.

What I claim is:

1. A method for disposal of flow-out mercury, brine, and foreign substances discharged from a mercury-cathode chlorine cell of the type, wherein mercury flowing over at least one primary electrolytic chamber is poured as a uniform sheet into an oblong mercury flow-out trough over a side wall thereof, which trough is disposed perpendicularly to the flow direction of said mercury, and then said mercury flows along said trough to be discharged as flow-out mercury from a transverse side of the electrolytic cell, which comprises: discharging a greater part of the flow-out mercury through a mercury main discharge outlet provided at the lower part of the outlet end of said trough to an amalgam decomposer; discharging return brine and foreign substance suspended above the mercury together with a portion of the mercury through a return brine pipe having an inlet in the vicinity of said outlet end of said flow-out trough, said inlet having a lower rim positioned at least as high as the surface of the mercury in said trough at said outlet end; continuously separating from each other said return brine, mercury, and foreign substances thus discharged by means of a separator tank; and continuously conveying the mercury thus separated to a point of confluence with the mercury discharged by said mercury main discharge outlet toward said amalgam decomposer.

2. A separation device for disposal of flow-out mercury, brine, and foreign substances discharged from a mercury-cathode chlorine cell of the type, wherein mercury flowing over at least one primary electrolytic chamber is poured as a uniform sheet into an oblong mercury flow-out trough over a side wall thereof, which trough is disposed perpendicularly to the flow direction of said mercury, and then said mercury flows along said trough to be discharged as flow-out mercury from a transverse side of the electrolytic cell, comprising, in combination: a mercury main discharge outlet provided at the lower part of the outlet end of said mercury flow-out trough and functioning to discharge a greater part of the flow-out mercury to an amalgam decomposer and configured to maintain said mercury at a predetermined level; a return brine pipe having an inlet in the vicinity of said outlet end of said flow-out trough, said inlet having a lower rim positioned at least as high as the surface of the mercury in said trough at said outlet end, said return brine pipe functioning to discharge, from said trough, return brine and foreign substances suspended above the mercury together with a portion of the mercury; a separator tank connected to the downstream end of said return brine pipe for continuously separating from each other said return brine, mercury, and foreign substances thus discharged; and means for continuously conveying the mercury thus separated to a point of confluence with the mercury discharged by said mercury main discharge outlet toward said amalgam decomposer.

References Cited
UNITED STATES PATENTS

| | | | |
|---|---|---|---|
| 2,544,138 | 3/1951 | De Nora | 204—220 |
| 3,159,557 | 12/1964 | Wunderlich et al. | 204—219 XR |
| 3,308,043 | 3/1967 | Loftfield et al. | 204—219 XR |
| 3,310,482 | 3/1967 | Bon et al. | 204—219 |
| 3,360,453 | 12/1967 | Szechtman | 204—219 |

ROBERT K. MIHALEK, *Primary Examiner.*